US006867814B2

(12) United States Patent
Adams et al.

(10) Patent No.: US 6,867,814 B2
(45) Date of Patent: Mar. 15, 2005

(54) METHOD, SYSTEM AND ARTICLE OF MANUFACTURE FOR IDENTIFYING THE SOURCE TYPE AND QUALITY LEVEL OF A VIDEO SEQUENCE

(75) Inventors: Dale R. Adams, San Jose, CA (US); William Sheet, Fremont, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 258 days.

(21) Appl. No.: 09/837,894

(22) Filed: Apr. 18, 2001

(65) Prior Publication Data

US 2002/0149703 A1 Oct. 17, 2002

Related U.S. Application Data

(60) Provisional application No. 60/198,044, filed on Apr. 18, 2000.

(51) Int. Cl.[7] .......................... H04N 7/01; H04N 11/20
(52) U.S. Cl. ..................... 348/448; 348/459; 348/441
(58) Field of Search ................. 348/448, 459, 348/441, 458, 556, 558, 700, 456, 412.1, 911, 97, 70; 375/240.02, 240.01; 382/236; 386/111, 131

(56) References Cited

U.S. PATENT DOCUMENTS

| | | |
|---|---|---|
| 4,002,827 A | 1/1977 | Nevin et al. |
| 4,689,675 A | 8/1987 | Tchorbajian |
| 4,731,660 A | 3/1988 | Faroudja et al. |
| 4,790,028 A | 12/1988 | Ramage |
| 4,876,596 A | 10/1989 | Faroudja |
| 4,881,125 A | 11/1989 | Drause |
| 4,937,667 A | 6/1990 | Choquet et al. |
| 4,959,715 A | 9/1990 | Prodan |
| 4,982,280 A | 1/1991 | Lyon et al. |
| 4,989,090 A | 1/1991 | Campbell et al. |
| 4,998,287 A | 3/1991 | Katznelson et al. |
| 5,014,119 A | 5/1991 | Faroudja |
| 5,257,103 A * | 10/1993 | Vogeley et al. .............. 348/450 |
| 5,291,275 A | 3/1994 | Lumelsky |
| 5,291,280 A | 3/1994 | Faroudja et al. |
| 5,299,029 A | 3/1994 | Moriya et al. |
| 5,347,314 A | 9/1994 | Faroudja et al. |
| 5,428,398 A | 6/1995 | Faraoudja |
| 5,444,493 A | 8/1995 | Boie |
| 5,448,554 A | 9/1995 | Van Steenbrugge |
| 5,469,216 A | 11/1995 | Takahashi et al. |
| 5,471,577 A | 11/1995 | Lightbody et al. |
| 5,473,383 A | 12/1995 | Sezan et al. |
| 5,488,422 A | 1/1996 | Faroudja et al. |

(List continued on next page.)

FOREIGN PATENT DOCUMENTS

WO  WO00/16561  3/2000

OTHER PUBLICATIONS

Micron Technology Inc., Technical Note, *Achieve Maximum Compatibility in SDRAM/SGRAM Design*, (May 1997), pp. 1–6.

Micron Technology Inc., *Synchronous DRAM, 16 MEG: × 16 SDRAM*,(Oct. 1997), pp. 1–46.

*Primary Examiner*—Michael H. Lee
*Assistant Examiner*—Jean W. Désir
(74) *Attorney, Agent, or Firm*—Perkins Coie LLP

(57) ABSTRACT

A deinterlacing system which converts an interlaced video stream into a progressive video stream is disclosed. The deinterlacing system includes a field assembly responsive to a last field, a next field, a current field and progressive source phase and operative to develop a progressive output frame, a source detection module responsive to last, next and current fields and operative to develop a progressive source phase and a progressive source detected and an intra-frame deinterlacer responsive to the progressive output frame and the progressive source detected and operative to develop a progressive frame output.

21 Claims, 12 Drawing Sheets

U.S. PATENT DOCUMENTS

| | | | |
|---|---|---|---|
| 5,521,644 A | 5/1996 | Sezan et al. ................. | 348/452 |
| 5,530,484 A | 6/1996 | Bhatt et al. | |
| D371,357 S | 7/1996 | Nakamura | |
| 5,532,750 A | 7/1996 | De Haan et al. | |
| 5,532,751 A | 7/1996 | Lui | |
| 5,543,858 A | 8/1996 | Wischermann | |
| 5,550,592 A | 8/1996 | Markandey et al. | |
| 5,563,651 A | 10/1996 | Christopher et al. | |
| 5,600,731 A | 2/1997 | Sezan et al. | |
| 5,602,654 A | 2/1997 | Patti et al. | |
| 5,606,373 A * | 2/1997 | Dopp et al. ................. | 348/459 |
| 5,619,272 A | 4/1997 | Salmon et al. | |
| 5,621,470 A | 4/1997 | Sid-Ahmed | |
| 5,625,421 A | 4/1997 | Faroudja et al. | |
| 5,661,525 A | 8/1997 | Kovacevic et al. | |
| 5,689,301 A | 11/1997 | Christopher et al. | |
| 5,706,451 A | 1/1998 | Lightbody et al. | |
| 5,748,250 A | 5/1998 | Markandey et al. | |
| 5,754,248 A | 5/1998 | Faroudja | |
| 5,771,331 A | 6/1998 | Aoki et al. | |
| 5,784,115 A | 7/1998 | Bozdagi | |
| 5,793,435 A | 8/1998 | Ward et al. ................. | 348/448 |
| 5,838,381 A * | 11/1998 | Kasahara et al. ........... | 348/458 |
| 5,844,627 A | 12/1998 | May et al. | |
| 5,852,473 A * | 12/1998 | Horne et al. ................. | 348/558 |
| 5,856,930 A | 1/1999 | Hosono | |
| 5,963,261 A | 10/1999 | Dean | |
| 6,014,182 A | 1/2000 | Swartz | |
| 6,034,733 A | 3/2000 | Balram et al. | |
| 6,040,873 A | 3/2000 | Izumi et al. ................. | 348/559 |
| 6,055,018 A | 4/2000 | Swan | |
| 6,058,140 A | 5/2000 | Smolenski | |
| 6,064,450 A * | 5/2000 | Canfield et al. ........ | 375/240.29 |
| 6,104,755 A | 8/2000 | Ohara | |
| 6,222,589 B1 | 4/2001 | Faroudja et al. | |
| 6,266,092 B1 | 7/2001 | Wang et al. | |
| 6,295,041 B1 | 9/2001 | Leung et al. | |
| 6,297,848 B1 * | 10/2001 | Westerman ................. | 348/448 |
| 6,298,144 B1 | 10/2001 | Pucker, II et al. | |
| 6,380,978 B1 * | 4/2002 | Adams et al. .............. | 348/452 |
| 6,392,712 B1 * | 5/2002 | Gryskiewicz et al. ....... | 348/584 |
| 6,437,835 B1 * | 8/2002 | Sakamoto .................... | 348/714 |
| 6,456,329 B1 * | 9/2002 | Tinker et al. ................ | 348/448 |
| 6,489,998 B1 * | 12/2002 | Thompson et al. ......... | 348/452 |
| 6,515,706 B1 * | 2/2003 | Thompson et al. ......... | 348/448 |
| 6,542,197 B1 * | 4/2003 | Ko ............................. | 348/452 |
| 6,542,198 B1 * | 4/2003 | Hung et al. ................. | 348/459 |
| 6,545,719 B1 | 4/2003 | Topper | |
| 6,567,097 B1 * | 5/2003 | Iwaki ........................ | 345/603 |
| 6,603,815 B2 * | 8/2003 | Suzuki et al. ............ | 375/240.2 |
| 2001/0016009 A1 | 8/2001 | Hurst | |
| 2002/0109790 A1 | 8/2002 | Mackinnon | |
| 2003/0098924 A1 * | 5/2003 | Adams et al. .............. | 348/448 |

\* cited by examiner

METHOD, SYSTEM AND ARTICLE OF MANUFACTURE FOR IDENTIFYING THE SOURCE TYPE AND QUALITY LEVEL OF A VIDEO SEQUENCE

CROSS REFERENCE TO RELATED APPLICATIONS

This application claims the benefit of U.S. Patent Provisional Application No. 60/198,044 filed on Apr. 18, 2000, now abandoned, and is related to U.S. patent application Ser. No. 09/372,713 filed on Aug. 11, 1999 and U.S. patent application Ser. No. 09/410,543 filed on Oct. 10, 1999, assigned to the assignee of the present invention, all of which are incorporated herein by reference.

BACKGROUND OF THE INVENTION

1. Field of the Invention

The present invention relates generally to the processing of video images, and more particularly to an adaptive and accurate method and apparatus for identifying the source type and quality level of a video sequence 2. Description of the Related Art The world's major television standards use a raster scanning technique known as "interlacing." Interlaced scanning draws horizontal scan lines from the top of the screen to the bottom of the screen in two separate passes, one for even numbered scan lines and the other for odd numbered scan lines. Each of these passes is known as a field.

Many of the sources of moving images which are used to produce interlaced video images are actually progressively scanned in nature. A single image or frame of a progressively scanned video source is scanned from the top of the screen to the bottom in a single pass. Common examples of such progressive sources are film and computer graphics.

In order for such a progressively scanned image to be utilized by an interlaced video system, it must be converted from a progressive scan format to an interlaced format. There are a number of standard techniques for performing this conversion. FIG. 1 illustrates a technique known as "3:2 pulldown", wherein a 24 frame/second progressive film source 2 is converted to a 60 field/second interlaced video sequence generally designated 4. In this technique, a pair of film frames 6 and 10 is converted to five video fields 8 and 12. A first frame 6 is converted to three fields 8 and a second frame 10 is converted to two fields 12—hence the term "3:2 pulldown". A similar technique is used when the ratio of progressive source frames to interlaced video fields is two to one. This is termed "2:2 pulldown" and is illustrated in FIG. 2, wherein a progressive source 14 is converted to a sequence of interlaced fields generally designated 16. Each source frame 18 is converted to two fields 20. The 2:2 pulldown technique is typically used in the transfer of 30 frame/second video or computer graphics to video standards which use a 60 field/second rate (e.g., NTSC), or in the transfer of film to video standards which use a 50 field/second rate (e.g., PAL and SECAM).

It is often necessary and/or desirable to convert an interlaced video signal to a progressive signal. Such conversion is advantageous, for example, when using a progressive-only display (a computer monitor), to eliminate the deficiencies of interlaced video formats (flicker, line twitter, or visible scan line structure), or to improve the compression ratio of a digital format (digital broadcast or satellite transmission). Unfortunately, many techniques for deinterlacing the video signal add a number of objectionable artifacts to the resultant progressive image. However, if an interlaced video signal can be identified as having originally come from a progressive source, then it is possible to reconstruct the original image frames without such deinterlacing artifacts. Techniques for identifying progressive sources analyze the video stream to detect patterns indicative of progressive sources. Both 3:2 pulldown and 2:2 pulldown have distinctive signature patterns which can be detected.

FIG. 3 illustrates a technique for identifying 3:2 pulldown sequences. A computation 22 is performed to yield an overall numeric value 24 indicative of the difference between pairs of fields 26 spaced two field periods apart. One numeric value (or field difference value) is produced during each field period. This field difference value is compared to a threshold value to determine if the fields being compared are similar or different. As shown in FIG. 3, in a 3:2 pulldown sequence there is a duplicated field 28 which occurs every five field periods. The presence of this duplicate field produces a pattern 30 which repeats over five field periods in which one field comparison yields a small field difference value (similar fields) while the remaining four field comparisons yield large field difference values (different fields). This pattern of low/high/high/high/high etc. is distinctive of 3:2 pulldown sequences.

FIG. 4 illustrates a technique for identifying 2:2 pulldown sequences. A computation 32 is performed on adjacent field pairs 34 which indicates the presence of a specific vertical high frequency component present in interlace motion artifacts. A relatively large frequency detection value 36 is produced for fields 38 which come from different original source frames 40 (since there can be interlace motion artifacts present between these frames), while a relatively low frequency detection value 42 is produced for field pairs 44 which come from the same original source frame 46. A threshold value is used to determine if the computed frequency detection value is 'high' or 'low'. A 2:2 pulldown sequence produces an alternating high/low/high/low pattern 48.

The methods described above suffer from a number of problems when used with imperfect real-world sources. For example, the field differencing technique for 3:2 pulldown identification works well with high quality sources since a comparison of identical fields yields a zero or very low comparison value. A sequence of field difference values generally designated 50 for such a source is shown in FIG. 5. In this example, the field difference values generally designated 52 for 'identical' fields are consistently very low while the field difference values generally designated 54 for other field comparisons are relatively high. This allows a simple, fixed comparison threshold 56 to easily distinguish between similar and different fields. However, and with reference to FIG. 6, for noisy sources a comparison of 'identical' fields no longer yields such a low value since noise causes the computation to return a 'low' value 60 that exceeds the threshold 62.

A number of other problems are present in real-world video sources. There are many possibilities for injection of noise into a signal, including poor Y/C separation, imperfect storage media, transmission noise, and digital compression artifacts. Other factors which can make identification of the source type difficult include video edits made without regard to a progressive source sequence, transitions between different source types, frame rate conversion of a video sequence, and mixing of multiple or unsynchronized source types within a single video frame.

Inaccurate identification of the source type due to these factors can have a number of negative consequences. These include the presence of interlace motion artifacts when the source is incorrectly determined to be progressive or when a source-type transition is missed, and unnecessary deinterlace processing artifacts (such as reduced vertical resolution) when the source is incorrectly determined to be interlaced. What is needed is a robust detection method and apparatus which not only correctly identifies the source type, but which also determines the overall quality level of a source so that deinterlace processing can be correctly tailored to each source.

SUMMARY OF THE INVENTION

The present invention meets these needs by providing an adaptive and accurate method and apparatus for identifying the source type and quality level of a video sequence. It should be appreciated that the present invention and various discreet features thereof can be implemented in numerous ways, including as a process, an apparatus, a system, a device, or a method. Furthermore, various discreet apparatus of the invention can be implemented in software or hardware. Several inventive embodiments of the present invention are described below.

In an embodiment of the present invention, a deinterlacing system which converts an interlaced video stream into a progressive video stream is disclosed. The deinterlacing system includes a field assembly responsive to a last field, a next field, a current field and progressive source phase and operative to develop a progressive output frame, a source detection module responsive to last, next and current fields and operative to develop a progressive source phase and a progressive source detected and an intra-frame deinterlacer responsive to the progressive output frame and the progressive source detected and operative to develop a progressive frame output.

In an embodiment of the present invention, a method for detecting a pulldown technique is disclosed. The method includes sequentially comparing adjacent pairs of frames of a video sequence to detect relatively high values and relatively low values of at least one frequency component of said adjacent pairs of frames and determining that the video sequence was produced by a 3:2 pulldown technique when a repeating pattern of the adjacent pairs is high/low/high/low/low values. Up to this time, two separate techniques were needed to detect 2:2 pulldown sequences and 3:2 pulldown sequences. Advantageously, now only one method can be used to detect either type of pulldown sequence.

In an additional embodiment of the present invention, a method for determining a noise level in a 3:2 pulldown detection system is disclosed. The method includes detecting a plurality of relatively low field difference values among a larger plurality of field difference values in a video stream created by a 3:2 pulldown technique and using a plurality of detected low field difference values to estimate a noise level of the video stream.

In yet an additional embodiment of the present invention, a method for dynamically determining threshold detection levels in a pulldown detection system is disclosed. The method includes detecting a noise level in a video stream created by a pulldown technique and dynamically adjusting a threshold detection level based upon the detected noise level and the video stream.

In another embodiment of the present invention, a method for processing a progressive source interlaced video stream is disclosed. The method includes deinterlacing the interlaced video stream to create a progressive video stream, determining a confidence level with respect to the progressive video stream and post processing the progressive video stream based upon the determined confidence level.

In an additional embodiment of the present invention, a method for detecting source-type sequence breaks in a video stream is disclosed. The method includes sequentially comparing adjacent pairs of frames of a video sequence to detect relatively high values and relatively low values of at least one frequency component of the adjacent pairs of frames and detecting source-type sequence breaks by analyzing a pattern of the relatively high and low values of at least one frequency component.

In yet another embodiment of the present invention, a deinterlacing system which converts an interlaced video stream into a progressive video stream is disclosed. The system includes a field assembly responsive to a last field, a next field, a current field and progressive source phase and operative to develop a progressive output frame; a source detection module responsive to last, next and current fields and operative to develop a progressive source phase and a progressive source detected and an intra-frame deinterlacer responsive to the progressive output frame and the progressive source detected and operative to develop a progressive frame output.

In another embodiment of the present invention, a video system which converts an interlaced video stream into a progressive video stream is disclosed. The system includes a signal source, an interlaced signal processor coupled to an output of the signal source, a buffer coupled to an output of the interlaced signal processor, a progressive source detection logic coupled to an output of the buffer, a set of progressive display drivers coupled to an output of the progressive source detection logic and a raster display coupled to an output of the progress display drivers.

In a final embodiment, a video system which converts an interlaced video stream into a progressive video stream is disclosed. The video system includes an interlaced signal source, a buffer having an input coupled to an output of the interlaced signal source, a deinterlacer having an input coupled to an output of the buffer, a display driver having an input coupled to an output of the deinterlacer, a display driver having an input coupled to an output of the deinterlacer and a raster display having an input coupled to an output of the display driver.

The present invention advantageously allows for the reduction of motion artifacts in video images. By correctly determining the source type and quality level of a video sequence, a video deinterlacer uses the information to combine fields which are time correlated and to process the image for motion artifacts in the case when fields are not time correlated. The result is a progressive video image which is free of defects and motion artifacts.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings wherein.

DETAILED DESCRIPTION OF THE PREFERRED EMBODIMENTS

A method and apparatus for accurate detection of the original source type and quality level of a series of video input fields is disclosed. In the following description, numerous specific details are set forth in order to provide a thorough understanding of the present invention. It will be understood however that the present invention may be practiced without some or all of these specific details. In other instances, well known process operations have not been described in detail in order not to unnecessarily obscure the present invention.

In a preferred embodiment of the invention, a number of techniques which improve the reliability of detection of the original source type and quality level of a video field sequence are utilized. By providing for multiple detection techniques in parallel, the limitations present in any single technique are overcome. The result of using multiple techniques is a detection scheme which adapts to changes in the source, including the original source type, edits and splices between non similar source types, varying noise types and levels, and the overall quality level of the source. In another aspect of the invention, five major techniques are employed and include:

1) Use of multiple detection techniques in parallel to improve reliability;

2) Determination of the noise level in a source;

3) Dynamic determination of threshold levels which adapt to the characteristics of the source;

4) Determination of the overall quality level of the source to enable artifact-removal post-processing when necessary; and 5) Robust identification of source-type breaks or discontinuities in the video sequence.

Figure 7:
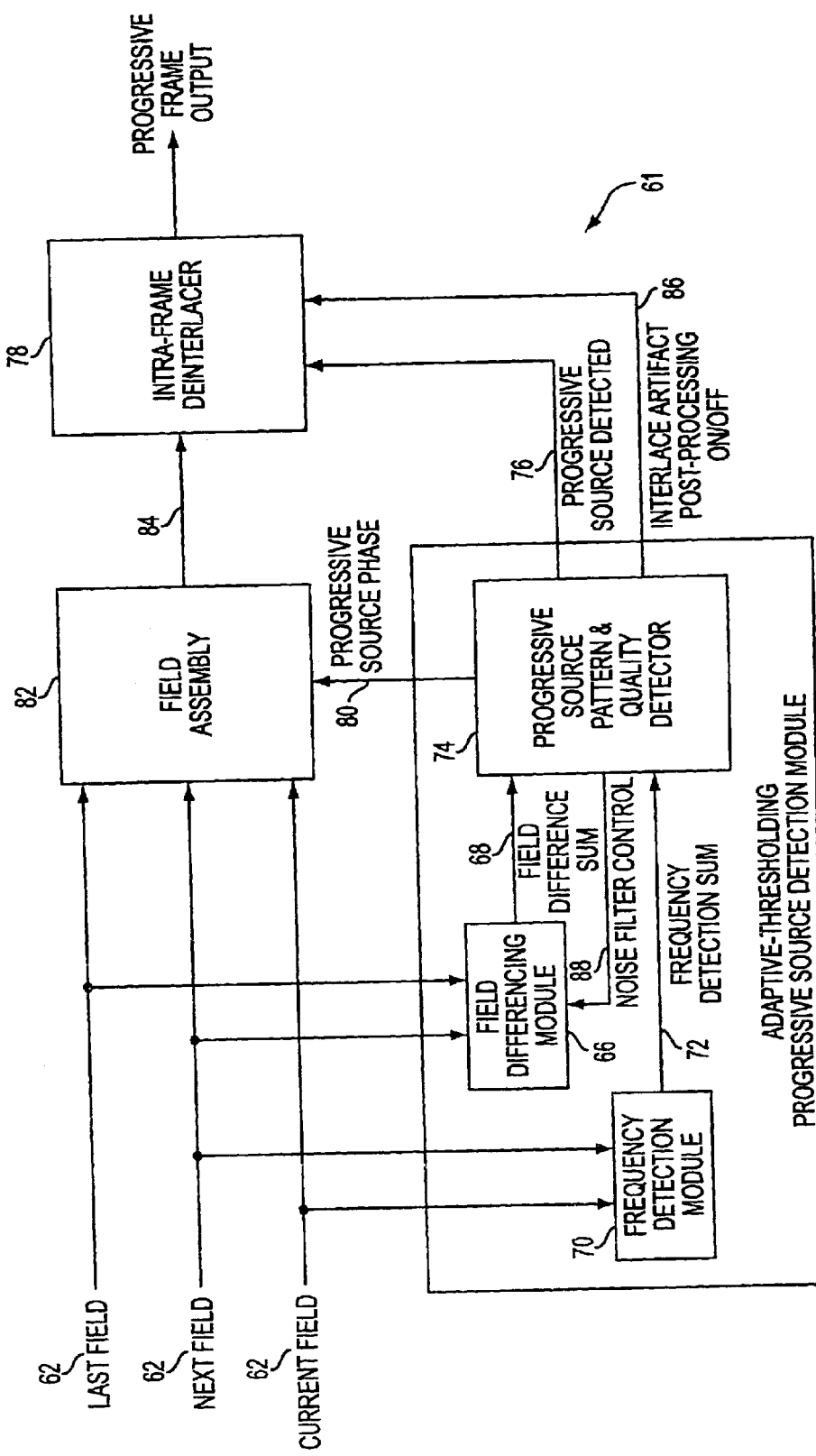
FIG. 7 is a block diagram of the source detector of the present invention.

The overall architecture of an adaptive-threshold source detection apparatus generally designated 61 (or can be referred to as a deinterlacer) is shown in FIG. 7. Data from three adjacent video fields 62 of a video sequence is provided as input to the detection apparatus 61. Within a progressive source detection module 64, a field differencing module 66 computes a field difference value 68 for each video field period based on fields spaced two field periods apart. Also within the progressive source detection module 64, a vertical high frequency detection module 70 computes the high frequency detection sum 72 of a pair of adjacent fields. The field difference value 68 and frequency detection sum 72 are provided as inputs to a progressive source pattern and quality detector module 74 which analyzes the series of field difference values and frequency detection sums for patterns indicative of progressive sources. Progressive source pattern and quality detector module 74 also computes an overall quality measurement for the video source.

The progressive source pattern and quality detector 74 provides three output signals to control the operation of the adaptive-threshold source detection apparatus 61. A progressive source detection signal 76 indicates that the video field sequence originally came from a progressive source. This is used to control the operation of an intra-frame deinterlacing module 78 operable to detect and remove interlace motion artifacts from the image. A progressive source phase signal 80 indicates the current position of the video sequence in the repetitive pattern of the detected source type (3:2 pulldown or 2:2 pulldown). The progressive source phase signal 80 further controls a field assembly module 82 which combines two input fields into a progressive output frame 84. An interlace artifact post-processing signal 86 controls the operation of a post-processing filter in the intra-frame deinterlacer 78 which processes the image to remove interlace motion artifacts. The progressive source pattern and quality detector 74 also produces a noise filter control signal 88 which controls the operation of a low level noise filter in the field differencing module 66.

A deinterlacing system which converts an interlaced video stream into a progressive video stream comprising a field assembly responsive to a last field, a next field, a current field and progressive source phase and operative to develop a progressive output frame, a source detection module responsive to last, next and current fields and operative to develop a progressive source phase and a progressive source detected and an intra-frame deinterlacer responsive to the progressive output frame and the progressive source detected and operative to develop a progressive frame output. The deinterlacing system further comprises an interlace artifact post-processing developed by the source detection model and sent to the intra-frame deinterlacer. The deinterlacing source detection module further comprises a frequency detection module responsive to the next field and the current field and operative to develop a frequency detection sum, a field differencing module responsive to the next field, the last field and a noise filter control and operative to develop a field difference sum and a progressive source pattern/quality detector responsive to the field difference sum and frequency detection sum and operative to develop the progressive source phase, the progressive source detected, the interlace artifact post-processing and the noise filter control.

1. Multiple Detection

Figure 1:
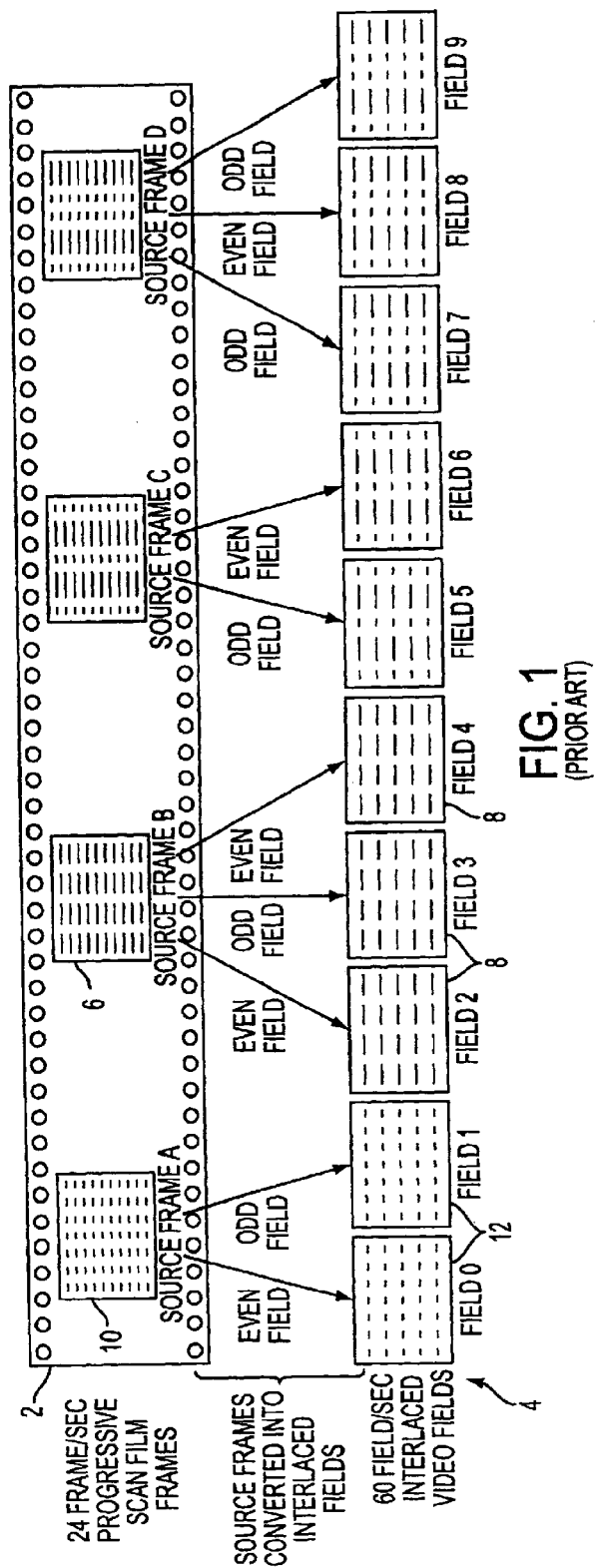
FIG. 1 illustrates a prior art method providing for 3:2 pulldown of a 24 frame/sec film source to 60 field/sec interlaced video fields.
Figure 2:
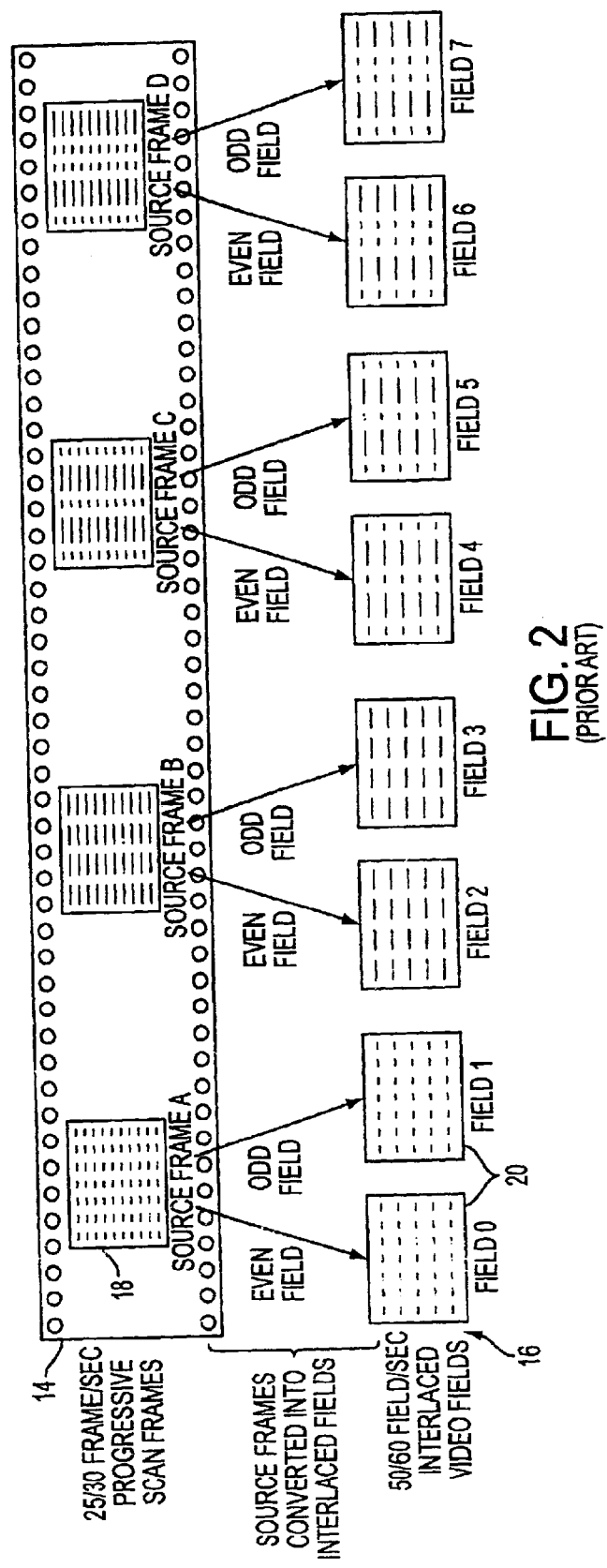
FIG. 2 illustrates a prior art method providing for 2:2 pulldown of a 25 or 30 frame/sec progressive source to 50 or 60 field/sec, respectively, interlaced video fields.
Figure 3:
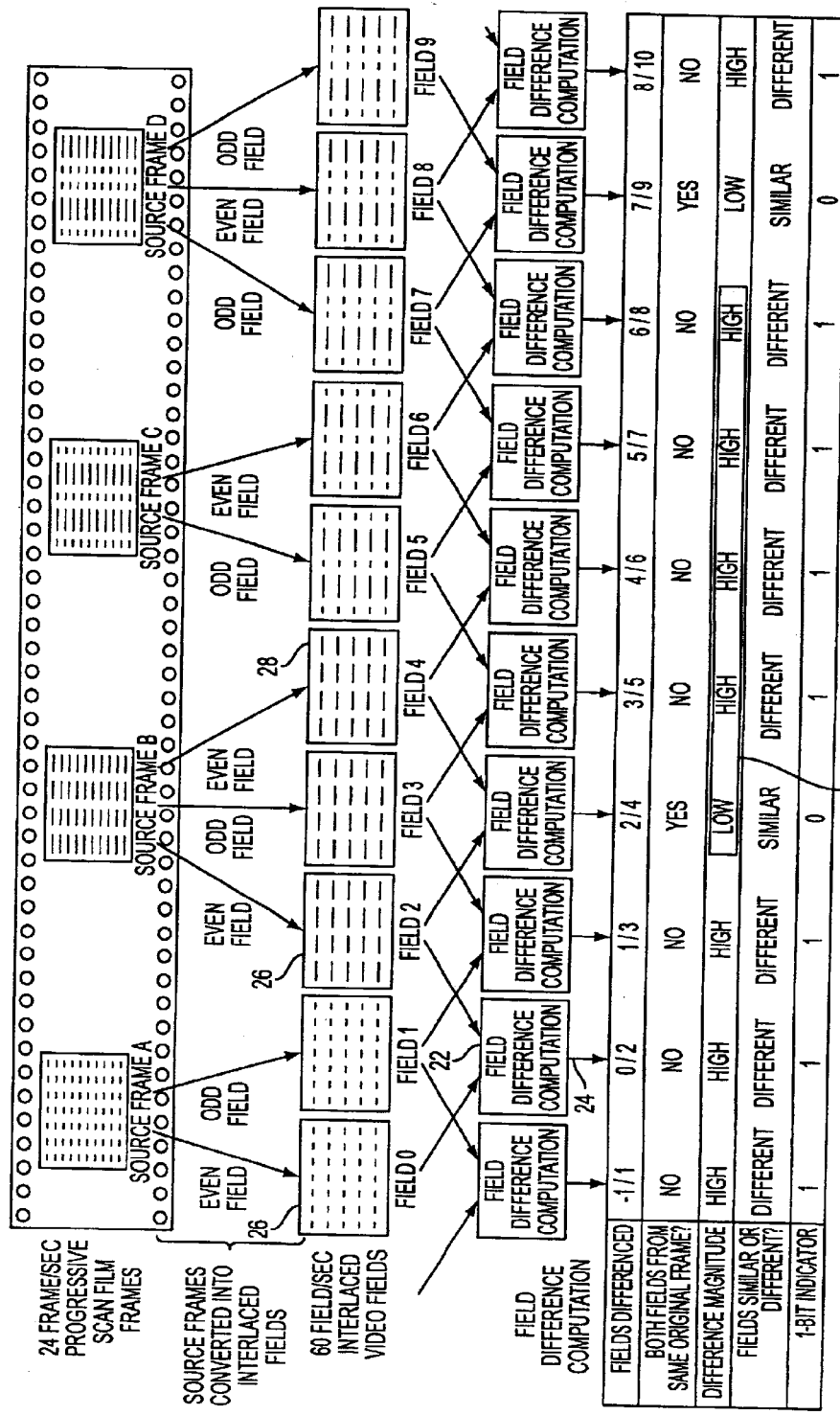
FIG. 3 illustrates a prior art analysis of a 3:2 pulldown video source by a field differencing technique.
Figure 4:
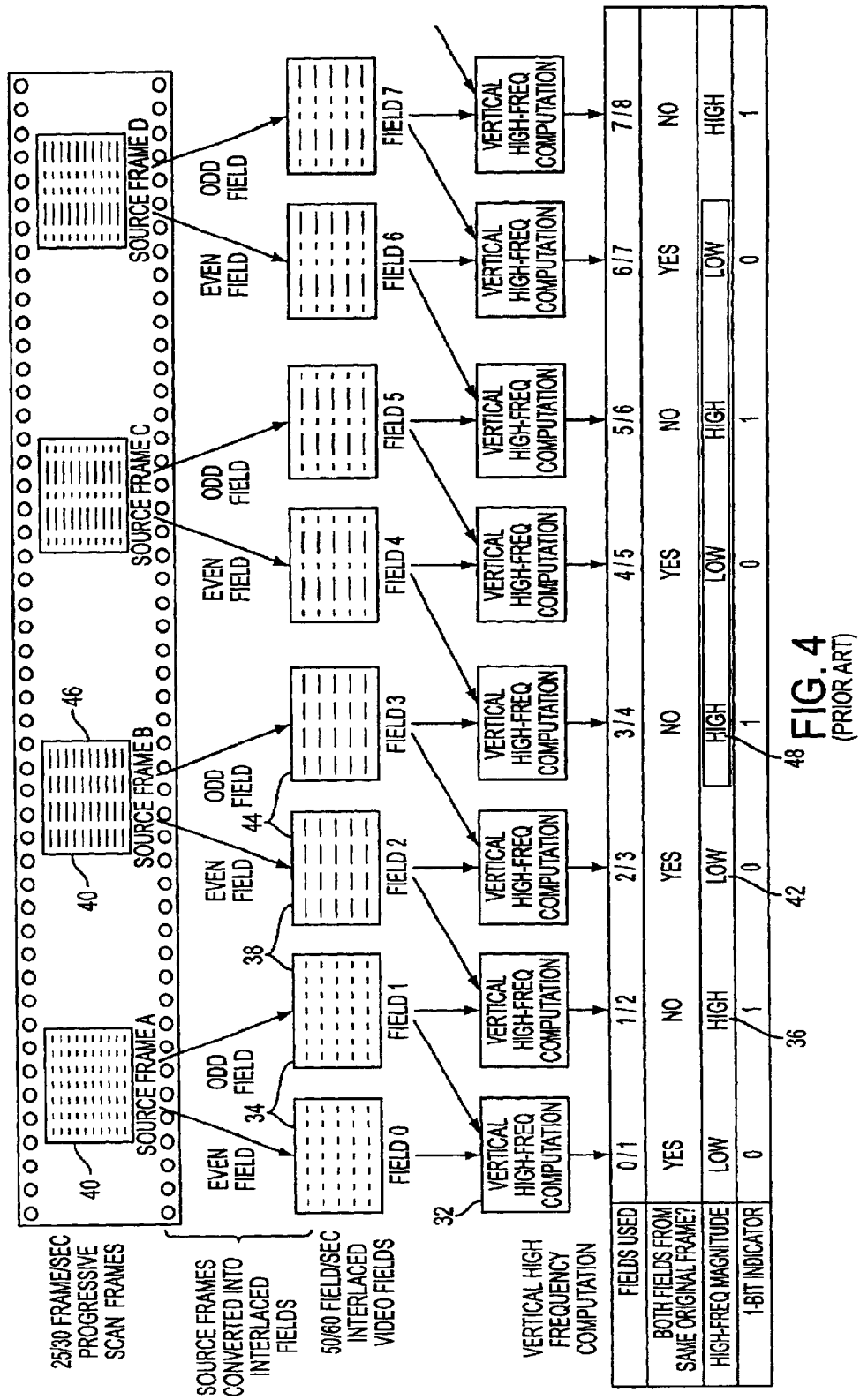
FIG. 4 illustrates a prior art analysis of a 2:2 pulldown video source by a vertical high-frequency detection technique.
Figure 5:
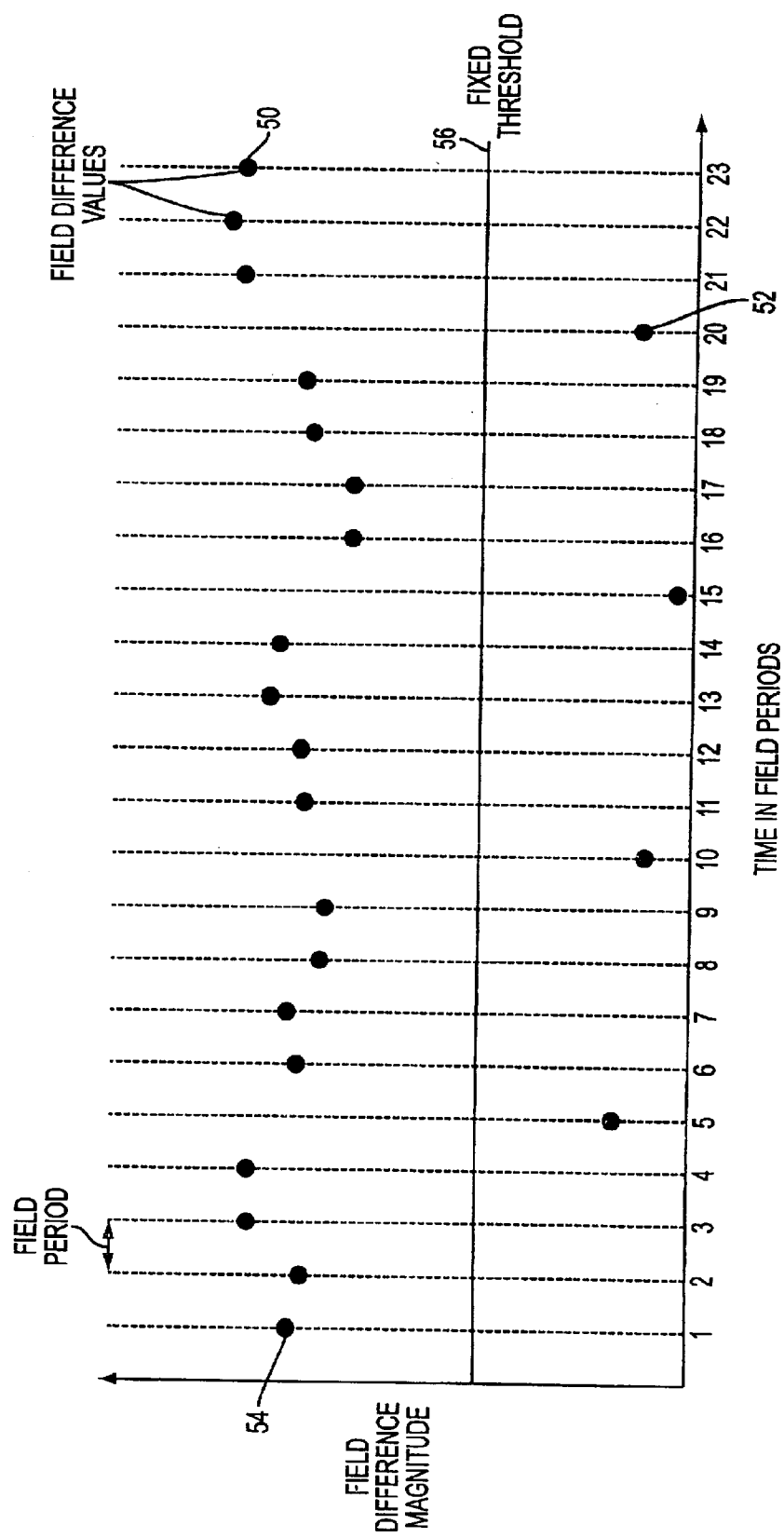
FIG. 5 illustrates the prior art behavior of a fixed threshold detection scheme for a well-behaved 3:2 pulldown video source.
Figure 8:
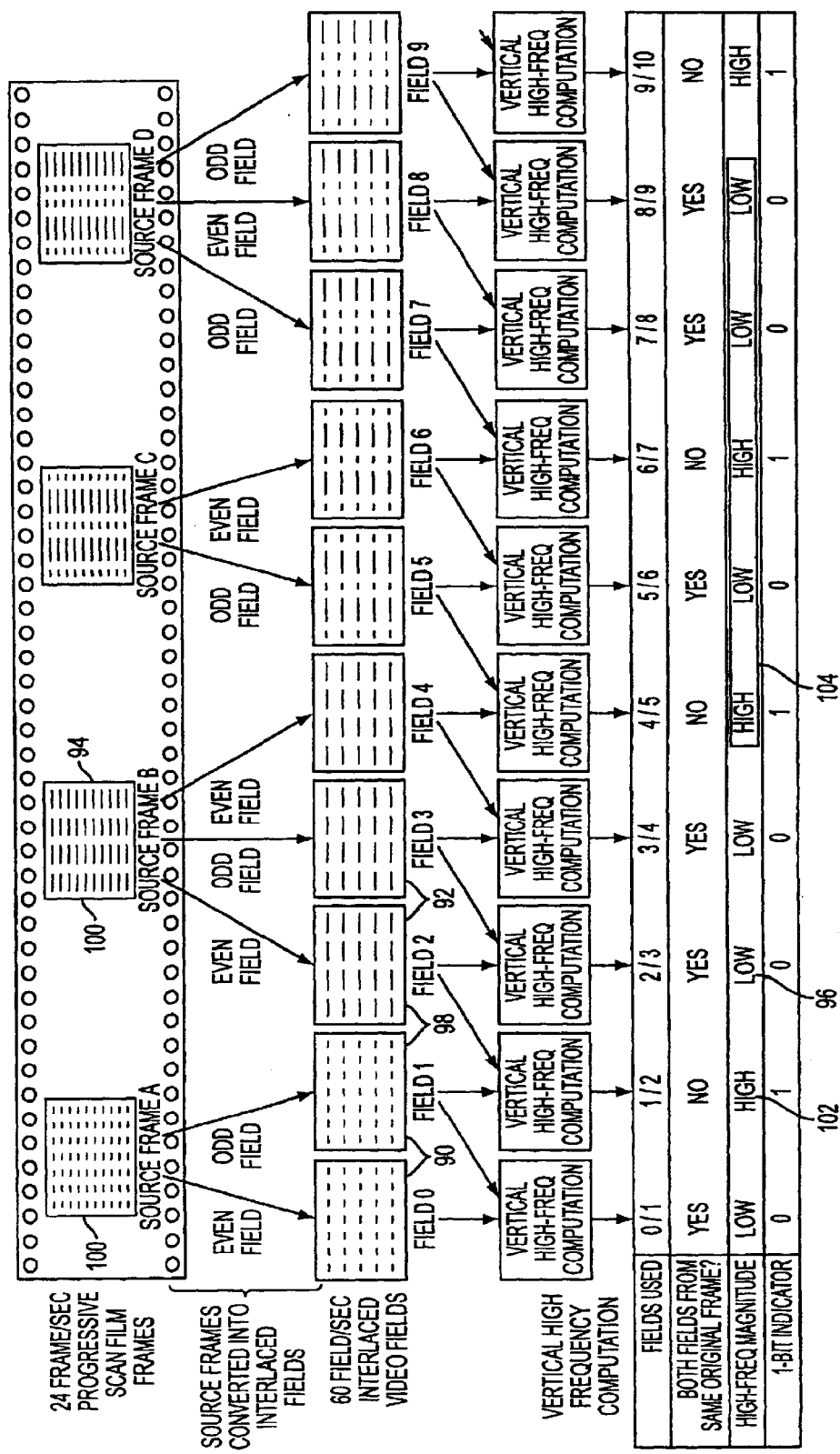
FIG. 8 illustrates the analysis of a 3:2 pulldown video source by a vertical high-frequency detection technique of the present invention.

FIG. 8 illustrates an alternate method of detecting video sequences using 3:2 pulldown. The vertical high frequency detection method previously described for detection of 2:2 pulldown sequences (see FIG. 4) can also be applied to detection of 3:2 pulldown. Adjacent field pairs 90 are analyzed for the presence of a specific vertical frequency component indicative of interlace motion artifacts. When both fields 92 come from the same original frame 94 a relatively low frequency detection value 96 is calculated; when the fields 98 come from different original source frames 100 a relatively high frequency detection value 102 is calculated. A 3:2 pulldown sequence will produce a distinctive, repetitive pattern 104 of such values—high/low/high/low/low etc. The presence of this pattern in conjunction with the earlier described pattern produced by field differencing, provides a high confidence that the detection of a 3:2 pulldown sequence is valid. The absence of this pattern indicates a lesser confidence that a valid 3:2 pulldown sequence is present.

Restated, a method for detecting a pulldown technique is accomplished by sequentially comparing adjacent pairs of frames of a video sequence to detect relatively high values and relatively low values of at least one frequency component (relative in terms of a low value to a high value) of the adjacent pairs of frames and determining that the video sequence was produced by a 3:2 pulldown technique when a repeating pattern of said adjacent pairs is high/low/high/low/low values. The method can also be used to determine that the video sequence was produced by a 2:2 pulldown technique when the repeating pattern is high/low/high/low values.

Up to this time, two separate techniques were needed to detect 2:2 pulldown sequences and 3:2 pulldown sequences. Advantageously, now only one method can be used to detect either type of pulldown sequence.

2. Determination of Noise Level

Figure 6:
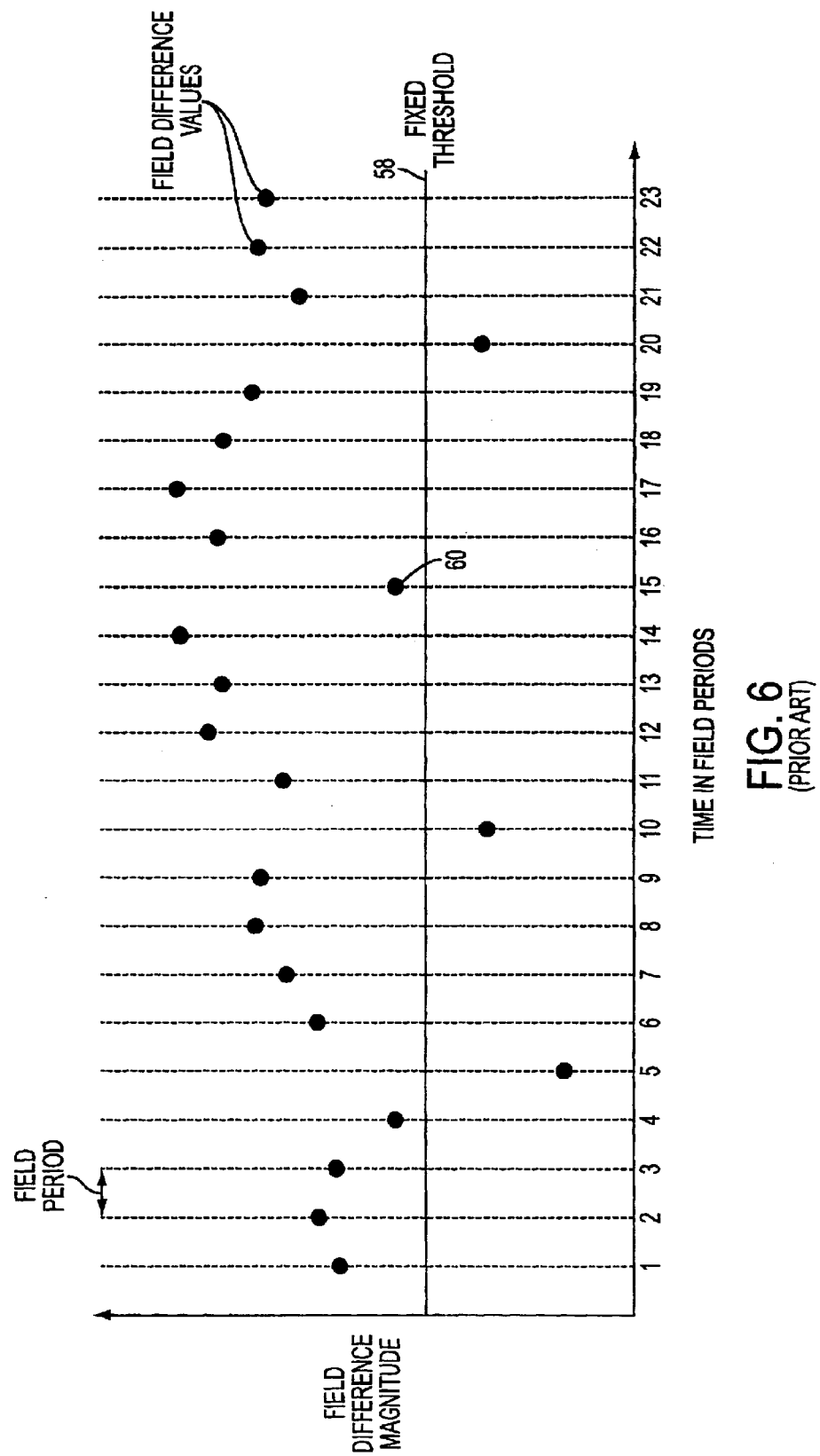
FIG. 6 illustrates the prior art behavior of a fixed threshold detection scheme for a poorly-behaved 3:2 pulldown video source.

The presence of noise in a video sequence can make it difficult to accurately determine the source type. An example of this is illustrated in FIG. 6, where noise which interferes with the detection of a 3:2 pulldown sequence in a fixed-threshold scheme causes a 'low' field difference value 60 to exceed the threshold 58. However, the very fact that the 'low' field difference values have relatively high values is an indication that the source is noisy. In a preferred embodiment the magnitude of the 'low' field difference values is utilized to make an estimate of the noise level of the source.

In another aspect of the invention, the sign of the slope of the 'low' field difference values is used to estimate the noise level. The slope is computed from a pair of 'low' field difference values in such manner that a 'low' value larger than the previous 'low' value indicates a positive slope and one lower than the previous value indicates a negative slope. If the signs of the last two slopes have not changed, then the most recent 'low' value is used as the estimate of the noise level; otherwise the average of the last two 'low' values is used. For the purpose of determining the sign of the slope, the 'low' field difference values are not determined by comparison with any threshold value, but rather by searching for the lowest value of the ten most recent field difference values. Assuming a 3:2 pulldown sequence is present, the ten most recent field difference values should contain two 'low' values. One is assumed to be the minimum value of the group and the other is assumed to be the field difference value that is five locations away from the minimum. A search for the minimum value from the ten most recent field difference values is initiated every time a new field difference value is calculated—i.e., once every field period. If the new minimum is either the newest value or the value that is five periods away from the newest value, then a new slope value is calculated. This slope value is then used to calculate the noise level estimate as described above. This noise level estimate is valid until it is again updated, which, for a 3:2 pulldown sequence, is five field periods away.

The noise level estimate is used for three purposes:

1) In the calculation of an adaptive field difference threshold level;

2) As a contributor to the quality measurement of the video source; and

3) To modify a low level noise filter used in the calculation of the field difference value.

The noise filter is operable to subtract a low threshold value from each of the pixel-by-pixel field difference values (which are then summed to form the overall field difference value used for 3:2 pulldown detection). If the noise level estimate is high, then the low threshold value is raised. If the noise level estimate is low, then the low threshold value is lowered. The low threshold value is updated whenever a new noise estimate is calculated. The low threshold value is updated according to the table below but with the following set of constraints:

1) It may not go below a minimum value (4).

2) It may go below a secondary minimum (6) only if the current noise level estimate is zero.

3) It may not go above a maximum value (18).

| Noise Level Estimate | Change in Low Threshold Value |
|---|---|
| <8k | −1 |
| 8k to 16k | 0 |
| 16k to 24k | +1 |
| >24k | +2 |

A reduction in the low threshold value will result in an overall increase in the field difference values, while an increase in the low threshold value will produce an overall decrease in the field difference values. Because of this, for a given noise level in the video source, the 'low' field difference values will stabilize either at the upper or lower range limits, or in the 8k to 16k range which results in no further change to the noise filter's low threshold value.

It will therefore be appreciated that a method for determining a noise level in a 3:2 pulldown detection system includes detecting a plurality of relatively low field difference values (relative in terms of a low value to a high value) among a larger plurality of field difference values in a video stream (for example a video signal) created by a 3:2 pulldown technique and using the plurality of detected low field difference values to estimate a noise level of the video stream. The detection of the plurality of low field difference values also includes detecting first, second and third sequential low field difference values. The first and second low field difference values are grouped into a first set and the second and third low field difference pairs are grouped into a second set. A first differential magnitude (differential refers to subtraction) is calculated between the first set of low field difference values and a second differential magnitude is calculated between the second set of low field difference values. The noise level is equated to the third sequential low field difference value if the first and second differential magnitudes are of the same sign. The noise level is equated to the average of the second sequential low field difference value and the third sequential low field difference value if the first and second differential magnitudes are of opposite signs.

3. Adaptive Threshold Levels

Figure 9:
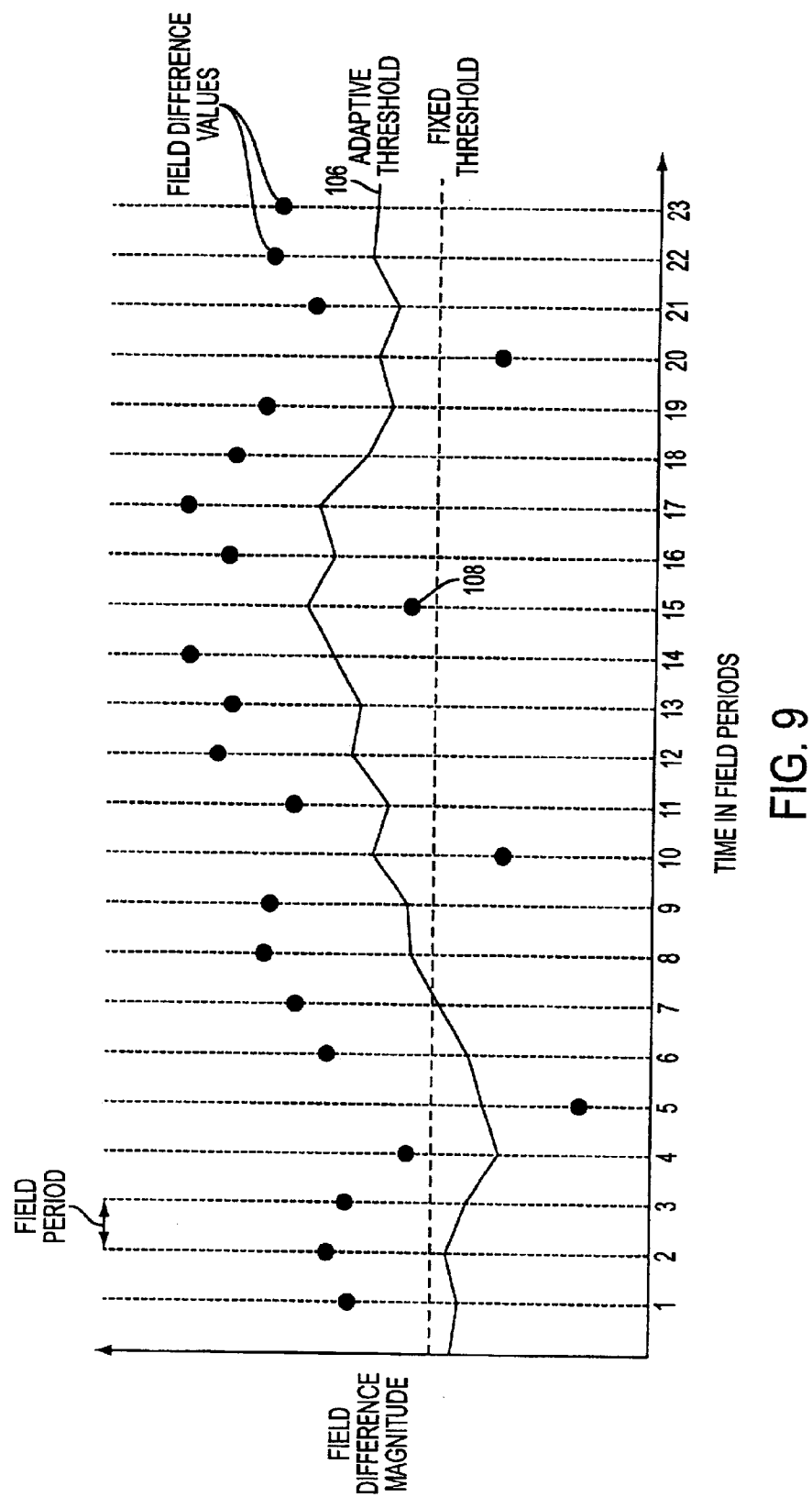
FIG. 9 illustrates the behavior of the adaptive threshold detection scheme of the present invention for a poorly-behaved 3:2 detection video source.

FIG. 6 illustrates the behavior of a fixed threshold implementation in detecting 3:2 pulldown with a noisy or poor-quality video source. In a preferred embodiment of the present invention, an adaptive threshold level which dynamically varies based upon the characteristics of the video source is provided. FIG. 9 illustrates the behavior of such a threshold 106 with the poor-quality source of FIG. 6. While the fixed threshold level fails to detect the third 'low' field difference value 108 as a true 'low', the adaptive threshold level, which is adjusted on a field-by-field basis, does not have this problem and allows the sequence of field difference values to be correctly identified as a 3:2 pulled own sequence.

For detection of a 3:2 pulldown pattern, the field differencing mechanism determines whether a newly calculated field difference value is 'high' or 'low' in the context of the preceding field difference values. Generally, a scaled average of the last five field difference values is used as a threshold to determine whether a newly calculated field difference value is 'high' or 'low' and consequently, whether the field sequence is from a 3:2 pulldown source. Prior to calculating the scaled average, the field difference values are modified to compensate for noise in the source.

The field difference detection threshold is determined by the following method: the noise level estimate is subtracted from each of last five field difference values, these five new values are summed up and divided by a scale factor, and the noise level estimate is added. The scale factor is based on the noise level estimate and is determined by the table below. In addition, if the current field difference value is expected to fall below the threshold (i.e., it is expected to be a 'low'), the scale factor is multiplied by two. A new threshold value is computed for each new field difference value, that is, once per field period.

| Noise Estimate | Scale Factor |
| --- | --- |
| 0 | $1/512$ |
| 1 to 256 | $1/128$ |
| 256 to 8K | $1/64$ |
| 8K to 32K | $1/32$ |
| >32K | $1/16$ |

The field difference threshold value calculation is shown in equation form below. When the field difference value is expected to be a 'high' it is:

$$\text{threshold} = \sum_{N=1}^{5} \frac{(\text{field difference value}_N - \text{noise level estimate})}{\text{scale } factor} + \text{noise level estimate}$$

When the field difference value is expected to be a 'low' it is:

$$\text{threshold} = 2\sum_{N=1}^{5} \frac{(\text{field difference value}_N - \text{noise level estimate})}{\text{scale } factor} + \text{noise level estimate}$$

An adaptive threshold scheme is further used to detect patterns in the sequences of frequency detection values used to detect 2:2 pulldown sequences. A frequency detection threshold is calculated and used as a means to decide whether the most recent frequency detection value is 'high' or 'low'.

For 2:2 pulldown detection, the frequency detection threshold is calculated based on the previous three frequency detection values. First, the amplitude between the most recent 'high' and 'low' values is determined. This is done by taking the magnitude of the difference between the average of the first and third previous values (both of which should be either 'high' or 'low' values in a 2:2 pulldown sequence) and the second previous value (which should be the opposite—'low' or 'high'—of the other two values). Either one-half or one-quarter of this value is then added to or subtracted from the value prior to the most recent value to produce the threshold value. A one-quarter multiple is used if 2:2 pulldown lock has already been established, otherwise a one-half multiple is used. An amplitude test is also performed if the previous frequency detection value is considered to be a 'high' and if a 2:2 pulldown sequence has not yet been established. The 'high' values must be greater than two times the subsequent 'low' value. If this amplitude test fails, the previous 'high' is considered to be a 'low'. This is done to prevent false 2:2 pulldown locks on true interlaced video sequences (i.e., where there is a temporal displacement between each field).

It will therefore be appreciated that a method for dynamically determining threshold detection levels (or 'threshold' as recited above) in a pulldown detection system includes detecting a noise level (noise level estimate) in a video stream created by a pulldown technique and dynamically adjusting a threshold detection level based upon the detected noise level and the video stream. The threshold detection level is determined by determining that the pulldown technique is 3:2, determining if a current field difference value is low or high, and calculating the new threshold detection level based on the current field difference value and a plurality of prior field difference values.

The calculation of the new threshold value for the high field difference value comprises subtracting the noise level from the current field difference value and the previous four field difference values resulting in five subtracted values, summing up the five subtracted values, dividing the sum by a scale factor based upon the noise level adding the noise level.

It will be further appreciated that the calculation of a new threshold value for the low field difference value comprises subtracting the noise level from the current field difference value and the previous four field difference values resulting in five subtracted values, summing up the five subtracted values, dividing the sum by a scale factor based upon the noise level, multiplying by 2, and adding the noise level.

For a 2:2 pulldown technique, the threshold detection level is determined by determining that the pulldown technique is 2:2, obtaining a first, second and third previous frequency detection value and dynamically adjusting a threshold detection level based on the first, second and third previous frequency detection values.

Dynamically adjusting the threshold detection level includes calculating a new threshold detection level by verifying that a 2:2 pulldown lock has not occurred, verifying that the first and third previous frequency detection values are low, obtaining an average of the first and third previous frequency detection values, obtaining the magnitude of the difference between the average and the second previous frequency detection value, dividing by 2 and adding to an immediately preceding calculated threshold level.

Dynamically adjusting the threshold detection level includes calculating a new threshold detection level is determined by verifying that a 2:2 pulldown lock has not occurred, verifying that the first and third previous frequency detection values are high, obtaining an average of the first and third previous frequency detection values, obtaining the magnitude of the difference between the average and the second previous frequency detection value, dividing by 2 and subtracting from an immediately preceding calculated threshold level.

Dynamically adjusting the threshold detection level includes calculating a new threshold detection level is determined by verifying that a 2:2 pulldown lock has occurred, verifying that the first and third previous frequency detection values are low, obtaining an average of the first and third previous frequency detection values, obtaining the magnitude of the difference between the average and the second previous frequency detection value dividing by 4 and adding to an immediately preceding calculated threshold level.

Dynamically adjusting the threshold detection level includes calculating a new threshold detection level is determined by verifying that a 2:2 pulldown lock has occurred, verifying that the first and third previous frequency detection values are high, obtaining an average of the first and third previous frequency detection values, obtaining the magnitude of the difference between the average and the second previous frequency detection value, dividing by 4 and subtracting from an immediately preceding calculated threshold level.

4. Source Quality Level

Once a pattern indicative of a progressive source is detected, a number of checks are performed to establish a confidence level in the accuracy of the detection. This can also be considered to be an indication of the 'quality' of the source. A poor quality source is more likely to give a false indication of a progressive sequence or is more likely to have some type of problem present. If the quality of the source is poor enough (or, alternatively, if the confidence level in the source detection is low) then there is the possibility that interlace motion artifacts could be present in the progressive output. In this case, an artifact removal post-processing module is activated. This is accomplished by calculating a 'quality metric' for the video source which varies dynamically with the source. Once the 'quality metric' exceeds a certain threshold, the artifact-removal post-processing module is engaged.

Figure 10:
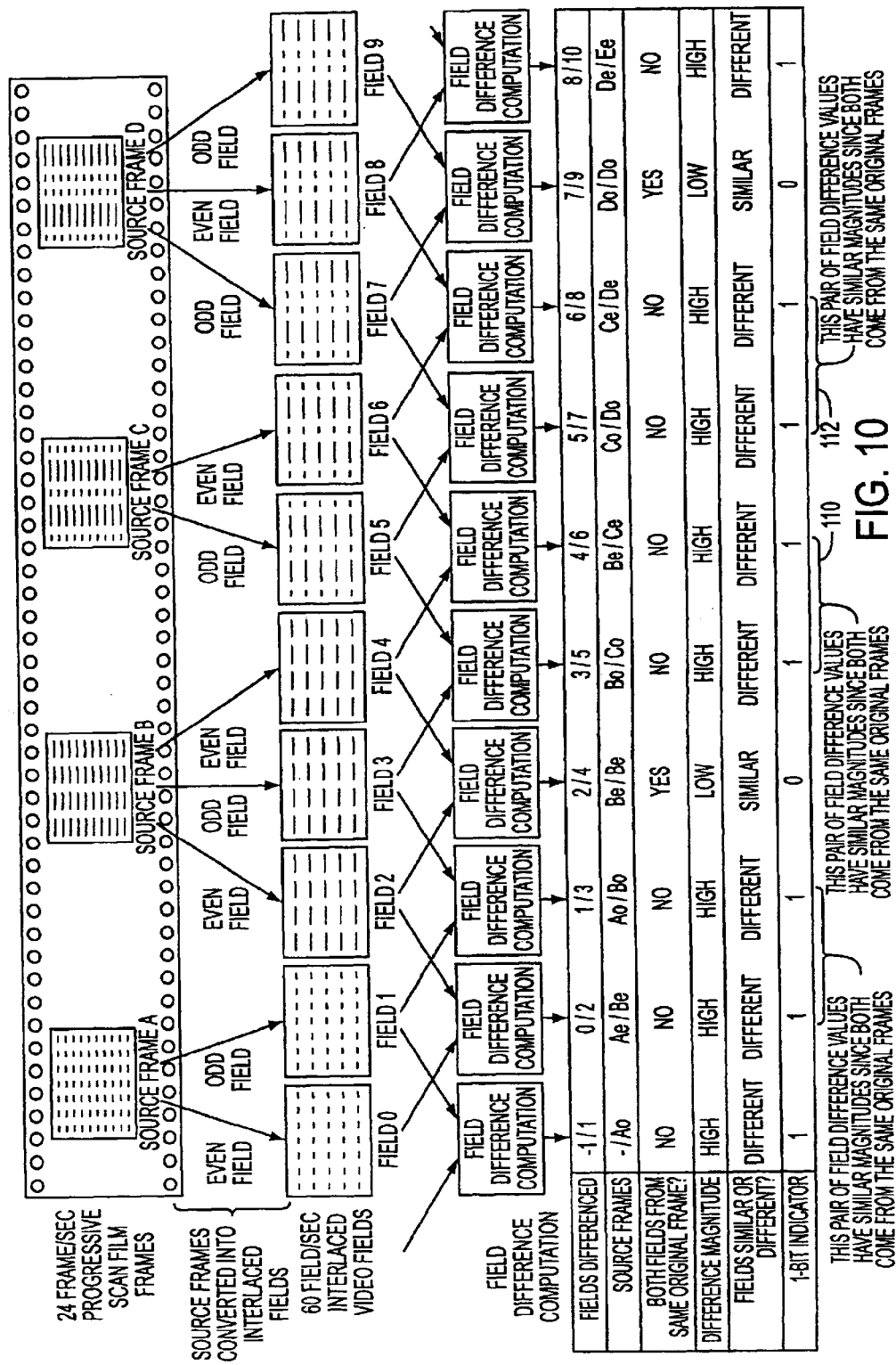
FIG. 10 illustrates the analysis of a 3:2 pulldown video source by a field differencing technique of the present invention which also includes analysis of field difference pair values.

There are a number of factors which contribute to the 'quality metric'. One of these is the field difference value itself. For 3:2 pulldown sequences the field difference value sequence should be a repetitive pattern of four 'high' values follow by one 'low' value. As shown in FIG. 10, the first and second high values 110 and the third and fourth high values 112 form two pairs of values. Because both values in a pair compare fields from the same pair of original source frames, both values in a pair should be approximately equal in magnitude. The larger the difference between the pair values, the greater the uncertainty in the detection. The pair difference is mapped to an accumulator which decays over time. This accumulator, or pair history value, is then mapped to the 'quality metric'. A history value provides a good estimate of the uncertainty in the detection since it is possible for poor quality or false 3:2 pulldown sequence to have a mix of some pairs which are very similar and some pairs which are very different. The table below describes the mapping of the pair difference percentage to the change in the pair history values. Since this pair relationship is only exhibited by video sequences which come from progressive sources, the pair history value is only increased if a progressive sequence pattern has been detected.

| Difference Percentage | Pair History Value Modifier |
| --- | --- |
| 25%–50% | +16 |
| 50%–75% | +24 |
| 75% | +32 |

The pair difference percentage is calculated as the absolute value of the pair difference divided by the smaller of the pair values. This percentage is then mapped to a modifier of the pair history value. The pair history value is decremented by one every field period (unless it is at zero). If a pair difference is determined to be sufficiently large to yield a positive modifier, then the modifier is added to the history value immediately after it is decremented for that field period. The history value has an upper limit of 128. The contribution of the pair values to the 'quality metric' is one quarter of the current pair history value.

The pair difference factor is also useful for evaluating the quality of a 2:2 pulldown source. The field difference values for a 2:2 pulldown video source will also have the same pair relationship as just described for a 3:2 pulldown source, except that the pair groups will not be separated by a 'low' field difference value. For 2:2 pulldown sources, the accumulator, or pair history value, is calculated in a similar manner to that described above for 3:2 pulldown sources, and contributes to the 'quality metric' in the same manner as well ('quality metric' and 'confidence level' can be used interchangeably).

In a preferred embodiment of the present invention, the field difference noise filter low threshold value is used as a 3:2 pulldown detection reliability indicator. For sources which are less noisy and therefore easier to correctly detect as 3:2 pulldown sequences, the low threshold value will, in general, tend to gravitate toward a smaller value. If the noise level in the source increases, or if there is break in a 3:2 pulldown sequence, the low threshold value will become elevated. Since the noise filter low threshold value has a minimum value of 4, the contribution of the noise filter low threshold value to the 'quality metric' is one quarter of the difference of the low threshold minus 4.

In a preferred embodiment of the present invention, the confidence of a detected progressive sequence is affected by the number of source-type transitions in the last 240 field periods. Periodically, it is possible to lose lock on a progressive sequence. This loss of lock may occur for a number of reasons: The video source may be switching between a 3:2 or 2:2 pulldown sequence and a non-progressive sequence; the video source may be so noisy that it is difficult to maintain a consistent lock on the source sequence; or the source may have been converted from one frame rate to another, with video fields duplicated or deleted at periodic intervals. If the number of detected source-type transitions within the last 240 field periods is greater than 4, then the 'quality metric' value includes half of the transition count.

The frequency detection values are also used to modify the 'quality metric'. When a frequency detection sequence does not indicate 3:2 pulldown while a field difference sequence does, there is some uncertainty in the accuracy of the source-type detection. If a frequency detection lock has not been established for a 3:2 pulldown sequence, then the 'quality metric' is increased by one. The relative difference between the 'high' and 'low' frequency detection values is also a factor in the 'quality metric'. If the ratio of 'high' to 'low' values is greater than 3, then the 'quality metric' is not affected. If the ratio is lower than 3 but higher than 2, then the 'quality metric' is increased by one. Ratios lower than 2 result in an increase in the 'quality metric' of two.

Three levels of processing determined by the 'quality metric' for video sequences that have been detected as coming from a progressive source are provided. When the 'quality metric' is below a lower threshold value, the detection is considered to be very certain (or, the source is high quality) and fields are simply reassembled into frames to recreate the frames of the original progressive source. When the 'quality metric' is above the lower threshold but below an upper threshold, then the detection is considered to be questionable, and interlace artifact removal post-processing module is turned on. When the 'quality metric' is above the upper threshold, then the progressive source detection is considered to be completely unreliable and the video sequence is treated as if a progressive source had not been detected. These three processing levels are reflected in the states of the two of the three output signals from the progressive source pattern and quality detector 74 shown in FIG. 7. The progressive source detection signal 76 is asserted in the two highest quality levels and is deasserted in the lowest quality level. The interlace artifact post-processing signal 86 is asserted in the two lowest quality levels and is deasserted in the highest quality level.

It will therefore be appreciated that a method for processing a progressive source interlaced video stream includes deinterlacing the interlaced video stream to create a progressive video stream, determining a confidence level (quality level) with respect to the progressive video stream and post processing the progressive video stream based upon the determined confidence level. When the confidence level is below about a first threshold, no action is taken to improve the video sequence. When the confidence level is above about the first threshold but below about a second threshold, an interlace artifact removal process is initiated. When the confidence level is above the second threshold, the video source is processed as a non-progressive source. The confidence level is determined by combining at least two of the following elements: a field difference pair history value, a field difference noise filter low threshold value, a source type transition type count value, a sequence of frequency detection values and a ratio of high to low frequency detection values.

5. Source-type Sequence Breaks

In a preferred embodiment of the present invention, sequence breaks or source-type changes in the video sequence are detected utilizing three different methods. Detection of such discontinuities is provided to eliminate interlace motion artifacts in the progressive video output. If any one of the three methods indicates that a transition has occurred, then a sequence break is considered to have been detected. Once a sequence break is detected, the behavior of the intra-frame deinterlacer 78 is modified accordingly.

A first method of detecting sequence breaks uses the frequency detection values. During a sequence break a significant occurrence of interlace motion artifacts is expected, as is a related large increase in the frequency detection values. An increase is considered to be 'large' if it is greater than the sum of the previous five frequency detection values and also has an absolute level greater than one million.

Figure 11:
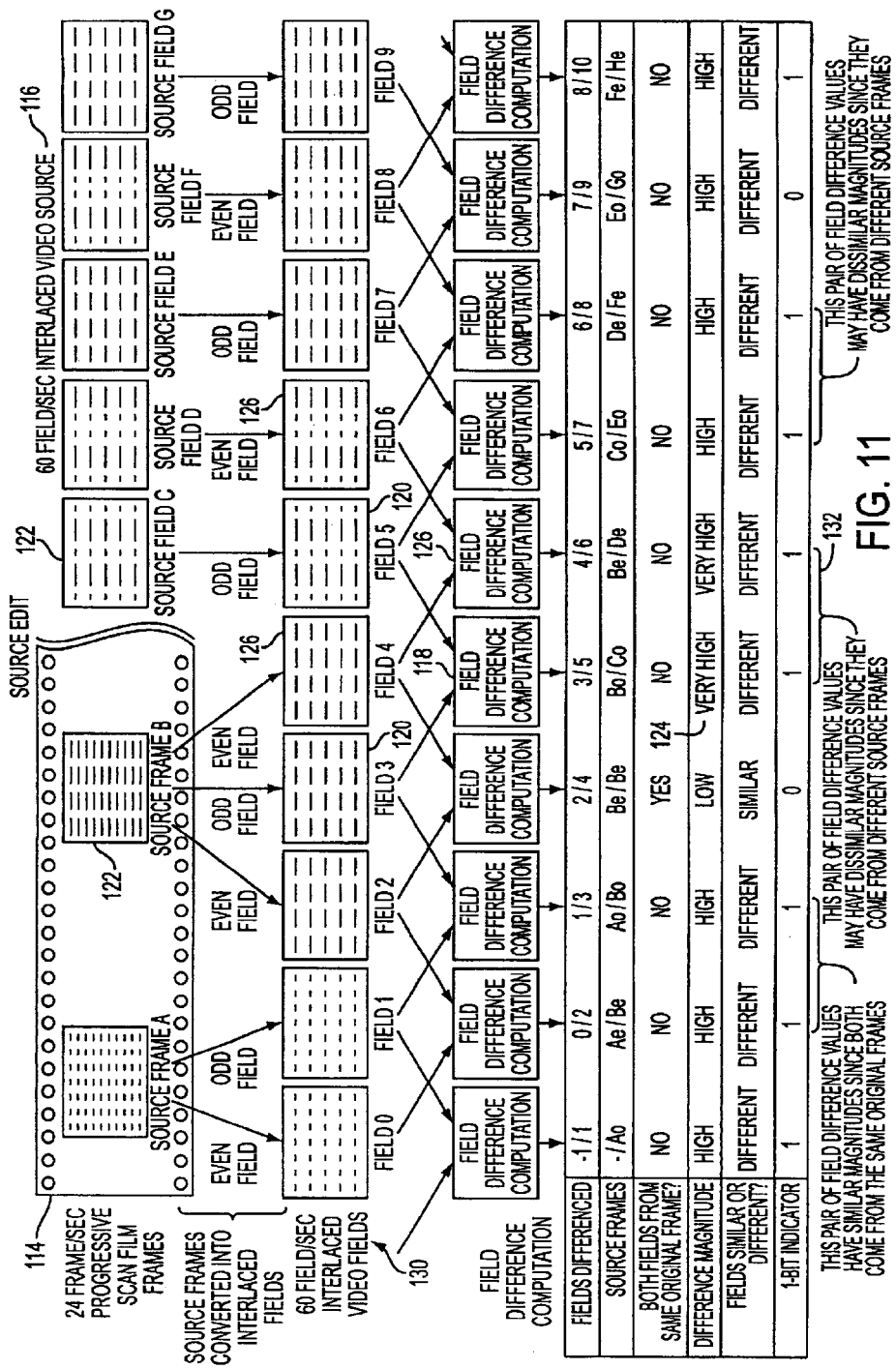
FIG. 11 illustrates the analysis of a transition between a 3:2 pulldown video source and an interlaced video source by a field differencing technique of the present invention.

A second method is similar to the first method, and is shown in FIG. 11 which illustrates a sequence break between a 3:2 pulldown sequence 114 and an interlaced video sequence 116. Just as there are large increases in the frequency detection values in the presence of a sequence break, there are also large increases in the field difference values. Since the source type has changed, the field difference comparison 118 will be between fields 120 from different original sources 122, resulting in large field difference values 124. 'Large' is defined as greater than the sum of the five previous field difference values and also greater than one million. In addition, the second method requires a correlated increase in the frequency detection values that corresponds to the jump in the field difference value. This related increase in the frequency detection value must be greater than the previous two frequency detection values. As a secondary consideration, there will sometimes be a field difference pair discrepancy at a sequence break. In FIG. 11, where the source type changes from film 114 to interlaced video 116, the field difference comparisons at the transition 118, 126 will be between different video fields 120, 128 from the input video sequence 130. This typically results in field difference pairs 132 which are very different from one another. While such a difference in the pair values will not be recognized as a sequence break per se, it will often result in a 'quality metric' value sufficiently poor enough to result in a change in the video processing mode.

A third method looks for breaks in the frequency detection 3:2 pulldown sequence to establish a sequence break. For a 3:2 pulldown sequence the frequency detection values should have a repetitive pattern of a large value followed by a small value, followed by a large value, and followed by two small values. A value is considered large if it is greater than the average of the previous five values and a value is considered to be small if it is less than the average of the last five values. In establishing the existence of a valid frequency detection 3:2 pulldown sequence, large values must also be greater than twice the previous value (which should be a small value), while small values must also be less than half the previous value if that value is supposed to be a large value. If the frequency detection 3:2 pulldown sequence has been established according to the above criteria for 20 field periods, then it is confirmed as a valid sequence. Breaks in a confirmed frequency detection 3:2 pulldown sequence may or may not result in recognition of a sequence break. If a break occurs because a large value is greater than the average of the previous five values but less than twice the previous value, or, if a small value is less than the average of the previous five values but not less than half of the previous value (if it supposed to be a large value), then no sequence break is considered to have occurred. However, if the break occurs because an expected larger value is less the average of the previous five values or if an expected small value is greater than the average of the previous five values, then a sequence break is considered to have been detected. In either case, once a confirmed sequence is broken, it must be re-established again before a scene transition can be detected.

Once a sequence break has been detected post-processing for interlace artifact removal is turned on for a preset number for field periods. During the preset period following a sequence break when artifact-removal post processing is turned on, the field difference noise filter low threshold will not be modified since it is likely that false field difference minimums may be identified. Finally, scene transition detection method 3 from above is reset to its starting state.

It will therefore be appreciated that a method for detecting source-type sequence breaks in a video stream includes sequentially comparing adjacent pairs of frames of a video sequence to detect relatively high values and relatively low values of at least one frequency (relative in relation to each other) component of the adjacent pairs of frames and detecting source-type sequence breaks by analyzing a pattern of the relatively high and low values of at least one frequency component. The detection of source-type sequence breaks comprises obtaining a frequency detection value, calculating a sum of a number of previous frequency detection values, determining that a source-type sequence break has occurred if the frequency detection value is greater in magnitude than the sum and the frequency detection value is greater than a given threshold. The detection of source-type sequence breaks comprises obtaining a frequency detection value, obtaining a field difference value, calculating a sum of a number of previous field difference values, comparing the frequency detection value with two previous frequency detection values and determining that a source-type sequence break has occurred if the field difference value is larger than the sum and larger than a given threshold and the frequency detection is larger than the two previous frequency detection values. The detection of source-type sequence breaks comprises obtaining a high magnitude frequency detection value, obtaining a low magnitude frequency detection value, calculating an average of a number of previous frequency detection values, comparing the high magnitude and low magnitude frequency detection values with the average and determining that a source-type sequence break has occurred if the high magnitude frequency value is less than the average or the low magnitude frequency detection value is greater than the average.

Figure 12:
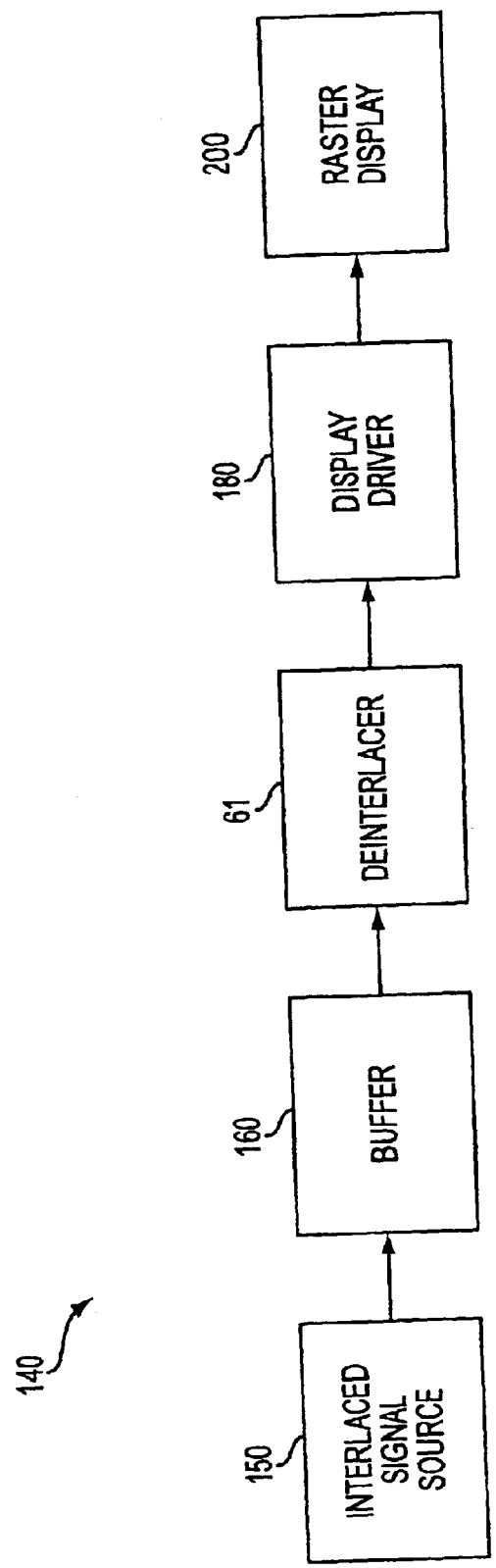
FIG. 12 illustrates a video system for deinterlacing video signals.

FIG. 12 shows a video system 140 which converts an interlaced video stream into a progressive video stream. The system includes an interlaced signal source 150, a buffer 160 having an input coupled to an output of the interlaced signal source 150, a deinterlacer 61 (corresponding to the deinterlacer 61 of FIG. 7) having an input coupled to an output of the buffer 160, a display driver 180 having an input coupled to an output of the deinterlacer 61, a display driver 200 having an input coupled to an output of the deinterlacer 61, and a raster display 200 having an input coupled to an output of the display driver 180. The interlaced signal source 150 can be derived from an analog or digital signal.

It will be further appreciated that the progressive source detection process of the present invention provides for improved image quality and the reduction of the presence of interlace motion artifacts. This is accomplished by identifying the type of the original motion picture source and using that information to help combine fields in the deinterlacing process. In addition, the determination of the overall quality level of the video field sequence significantly reduces the presence of interlace motion artifacts in the progressive video output of the deinterlacer. The combination of these techniques provides a low artifact, high-resolution deinterlaced image.

While this invention has been described in terms of several preferred embodiments, it will be appreciated that those skilled in the art, upon reading the preceding specifications and studying the drawings, will realize various alterations, additions, permutations, and equivalents as fall within the true spirit and scope of the invention.

What is claimed is:

1. A method for detecting a pulldown technique comprising:
    sequentially comparing adjacent pairs of frames of a video sequence to detect relatively high values and relatively low values of at least one frequency component of said adjacent pairs of frames; and
    determining that the video sequence was produced by a 3:2 pulldown technique when a repeating pattern of said adjacent pairs is high/low/high/low/low values wherein said high and low values are determined relative to a dynamically adjusted threshold detection level based upon a noise level in the video sequence created by the pulldown technique.

2. The method of claim 1 further comprising determining that the video sequence was produced by a 2:2 pulldown technique when the repeating pattern is high/low/high/low.

3. The method of claim 1 wherein the dynamically adjusted threshold detection level is based upon a noise level in the video sequence.

4. The method of claim 3 wherein the noise level in the video sequence is created by the pulldown technique.

5. The method of claim 2 wherein the dynamically adjusted threshold detection level is based upon a noise level in the video sequence.

6. The method of claim 5 wherein the noise level in the video sequence is created by the pulldown technique.

7. A method for determining a noise level in a 3:2 pulldown detection system comprising:
    detecting a plurality of relatively low field difference values among a larger plurality of field difference values in a video stream created by a 3:2 pulldown technique, wherein the detection of the plurality of low field difference values further comprises detecting first, second and third sequential low field difference values, and wherein the first and second low field difference values are grouped into a first set and the second and third low field difference pairs are grouped into a second set, and wherein a first differential magnitude is calculated between the first set of low field difference values and a second differential magnitude is calculated between the second set of low field difference values, and wherein the noise level is equated to the third sequential low field difference value if the first and second differential magnitudes are of the same sign;
    using said plurality of detecting low field difference values to estimate a noise level of said video stream.

8. A method for determining a noise level in a 3:2 pulldown detection system comprising:
    detecting a plurality of relatively low field difference values among a larger plurality of field difference values in a video stream created by a 3:2 pulldown technique, wherein the detection of the plurality of low field difference values further comprises detecting first, second and third sequential low field difference values, and wherein the first and second low field difference values are grouped into a first set and the second and third low field difference pairs are grouped into a second set, and wherein a first differential magnitude is calculated between the first set of low field difference values and a second differential magnitude is calculated between the second set of low field difference values, and wherein the noise level is equated to the average of the second sequential low field difference value and the third sequential low field difference value if the first and second differential magnitudes are of opposite signs;
    using said plurality of detecting low field difference values to estimate a noise level of said video stream.

9. A method for dynamically determining threshold detection levels in a pulldown detection system comprising:
    detecting a noise level in a video stream created by a pulldown technique; and
    dynamically adjusting a threshold detection level based upon said detected noise level and said video stream wherein the threshold detection level is determined by:

a) determining that the pulldown technique is 3:2;
b) determining if a current field difference value is low or high; and
c) calculating the new threshold detection level based on the current field difference value and a plurality of prior field difference values wherein the calculating of the new threshold detection level for the high field difference value is determined by
   i) subtracting the noise level from the current field difference value and the previous four field difference values resulting in five substracted values;
   ii) summing up the five substracted values;
   iii) dividing the sum by a scale factor based upon the noise level; and
   iv) adding the noise level.

10. A method for dynamically determining threshold detection levels in a pulldown detection system comprising:
detecting a noise level in a video stream created by a pulldown technique; and
dynamically adjusting a threshold detection level based upon said detected noise level and said video stream wherein the threshold detection level is determined by:
a) determining that the pulldown technique is 3:2;
b) determining if a current field difference value is low or high; and
c) calculating the new threshold detection level based on the current field difference value and a plurality of prior field difference values wherein the calculating of a new threshold detection level for the low field difference value comprising:
   i) subtracting the noise level from the current field difference value and the previous four field difference values resulting in five subtracted values;
   ii) summing up the five subtracted values;
   iii) dividing the sum by a scale factor based upon the noise level;
   iv) multiplying by 2; and
   v) adding the noise level.

11. A method for dynamically determining threshold detection levels in a pulldown detection system comprising:
determining that the pulldown technique is 2:2;
obtaining a first, second and third previous frequency detection value; and
dynamically adjusting threshold detection level based on the first, second and third previous frequency detection values wherein dynamically adjusting said threshold detection level includes calculating a new threshold detection level by:
a) verifying that a 2:2 pulldown lock has not occurred;
b) verifying that the first and third previous frequency detection values are low;
c) obtaining an average of the first and third previous frequency detection values;
d) obtaining the magnitude of the difference between the average and the second previous frequency detection value;
e) dividing by 2; and
f) adding to an immediately preceding calculated threshold level.

12. A method for dynamically determining threshold detection levels in a pulldown detection system comprising:
determining that the pulldown technique is 2:2;
obtaining a first, second and third previous frequency detection value; and
dynamically adjusting threshold detection level based on the first, second and third previous frequency detection values wherein dynamically adjusting said threshold detection level includes calculating a new threshold detection level by:
a) verifying that a 2:2 pulldown lock has not occurred;
b) verifying that the first and third previous frequency detection values are high;
c) obtaining an average of the first and third previous frequency detection values;
d) obtaining the magnitude of the difference between the average and the second previous frequency detection value;
e) dividing by 2; and
f) subtracting from an immediately preceding calculated threshold level.

13. A method for dynamically determining threshold detection levels in a pulldown detection system comprising:
determining that the pulldown technique is 2:2;
obtaining a first, second and third previous frequency detection value; and
dynamically adjusting threshold detection level based on the first, second and third previous frequency detection values wherein dynamically adjusting said threshold detection level includes calculating a new threshold detection level by:
a) verifying that a 2:2 pulldown lock has occurred;
b) verifying that the first and third previous frequency detection values are low;
c) obtaining an avenge of the first and third previous frequency detection values;
d) obtaining the magnitude of the difference between the average and the second previous frequency detection value;
e) dividing by 4; and
f) adding to an immediately preceding calculated threshold level.

14. A method for dynamically determining threshold detection levels in a pulldown detection system comprising:
determining that the pulldown technique is 2:2;
obtaining a first, second and third previous frequency detection value; and
dynamically adjusting threshold detection level based on the first, second and third previous frequency detection values wherein dynamically adjusting said threshold detection level includes calculating a new threshold detection level by:
a) verifying that a 2:2 pulldown lock has occurred;
b) verifying that the first and third previous frequency detection values are high;
c) obtaining an average the of first and third previous frequency detection values;
d) obtaining the magnitude of the difference between the average and the second previous frequency detection value;
e) dividing by 4; and
f) subtracting from an immediately preceding calculated threshold level.

15. A method for detecting source-type sequence breaks in a video stream comprising:
sequentially comparing adjacent pairs of frames of a video sequence to detect relatively high values and relatively low values of at least one frequency component of said adjacent pairs of frames; and
detecting source-type sequence breaks by analyzing a pattern of said relatively high and low values of at least one frequency component wherein the detection of source-type sequence breaks is determined by:

a) obtaining a frequency detection value;
b) calculating a sum of a number of previous frequency detection values; and
c) determining that a source-type sequence break has occurred if the frequency detection value is greater in magnitude than the sum and the frequency detection value is greater than a given threshold.

16. A method for detecting source-type sequence breaks in a video stream comprising:

sequentially comparing adjacent pairs of frames of a video sequence to detect relatively high values and relatively low values of at least one frequency component of said adjacent pairs of frames; and detecting source-type sequence breaks by analyzing a pattern of said relatively high and low values of at least one frequency component wherein the detection of source-type sequence breaks is determined by:
a) obtaining a frequency detection value;
b) obtaining a field difference value;
c) calculating a sum of a number of previous field difference values;
d) comparing the frequency detection value with two previous frequency detection values; and
e) determining that a source-type sequence break has occurred if the field difference value is larger than the sum and larger than a given threshold and the frequency detection is larger than the two previous frequency detection values.

17. A method for detecting source-type sequence breaks in a video stream comprising:

sequentially comparing adjacent pairs of frames of a video sequence to detect relatively high values and relatively low values of at least one frequency component of said adjacent pairs of frames; and detecting source-type sequence breaks by analyzing a pattern of said relatively high and low values of at least one frequency component wherein the detection of source-type sequence breaks is determined by:
a) obtaining a high magnitude frequency detection value;
b) obtaining a low magnitude frequency detection value;
c) calculating an average of a number of previous frequency detection values;
d) comparing the high magnitude and low magnitude frequency detection values with the average; and
e) determining that a source-type sequence break has occurred if the high magnitude frequency value is less than the average or the low magnitude frequency detection value is greater than the average.

18. A deinterlacing system which converts an interlaced video stream into a progressive video stream comprising:

a) a field assembly responsive to a last field, a next field, a current field and a progressive source phase and operative to develop a progressive output frame;
b) a source detection module responsive to last, next and current fields and operative to develop the progressive source phase and a progressive source detected wherein the source detection module further includes:
  i) a frequency detection module responsive to the next field and the current field and operative to develop a frequency detection sum;
  ii) a field differencing module responsive to the next field, the last field and a noise filter control and operative to develop a field difference sum; and
  iii) a progressive source pattern/quality detector responsive to the field difference sum and frequency detection sum and operative to develop the progressive source phase, the progressive source detected, the interlace artifact post-processing and the noise filter control; and
c) an intra-frame deinterlacer responsive to the progressive output frame and the progressive source detected and operative to develop a progressive frame output.

19. A video system which converts an interlaced video stream into a progressive video stream comprising:

a) an interlaced signal source;
b) a buffer having an input coupled to an output of the interlaced signal source wherein the buffer is operative to develop a last field, a next field and a current field;
c) a field assembly responsive to the last field, the next field, the current field and a progressive source phase and operative to develop a progressive output frame;
d) a source detection module responsive to last, next and current fields and operative to develop the progressive source phase and a progressive source detected wherein the source detection module further includes:
  i) a frequency detection module responsive to the next field and the current field and operative to develop a frequency detection sum;
  ii) a field differencing module responsive to the next field, the last field and a noise filter control and operative to develop a field difference sum; and
  iii) a progressive source pattern/quality detector responsive to the field difference sum and frequency detection sum and operative to develop the progressive source phase, the progressive source detected, the interlace artifact post-processing and the noise filter control
e) an intra-frame deinterlacer responsive to the progressive output frame and the progressive source detected and operative to develop a progressive frame output;
f) a display driver responsive to the progressive frame output; and
g) a raster display having an input coupled to an output of the display driver.

20. The video system of claim 19 wherein the interlaced signal source is derived from an analog signal.

21. The video system of claim 19 wherein the interlaced signal source is derived from a digital signal.

* * * * *